Sept. 3, 1957 L. C. BOSTIAN ET AL 2,805,122
PROCESS FOR PRODUCING AMMONIUM NITRITE
Filed Jan. 7, 1954 2 Sheets-Sheet 2
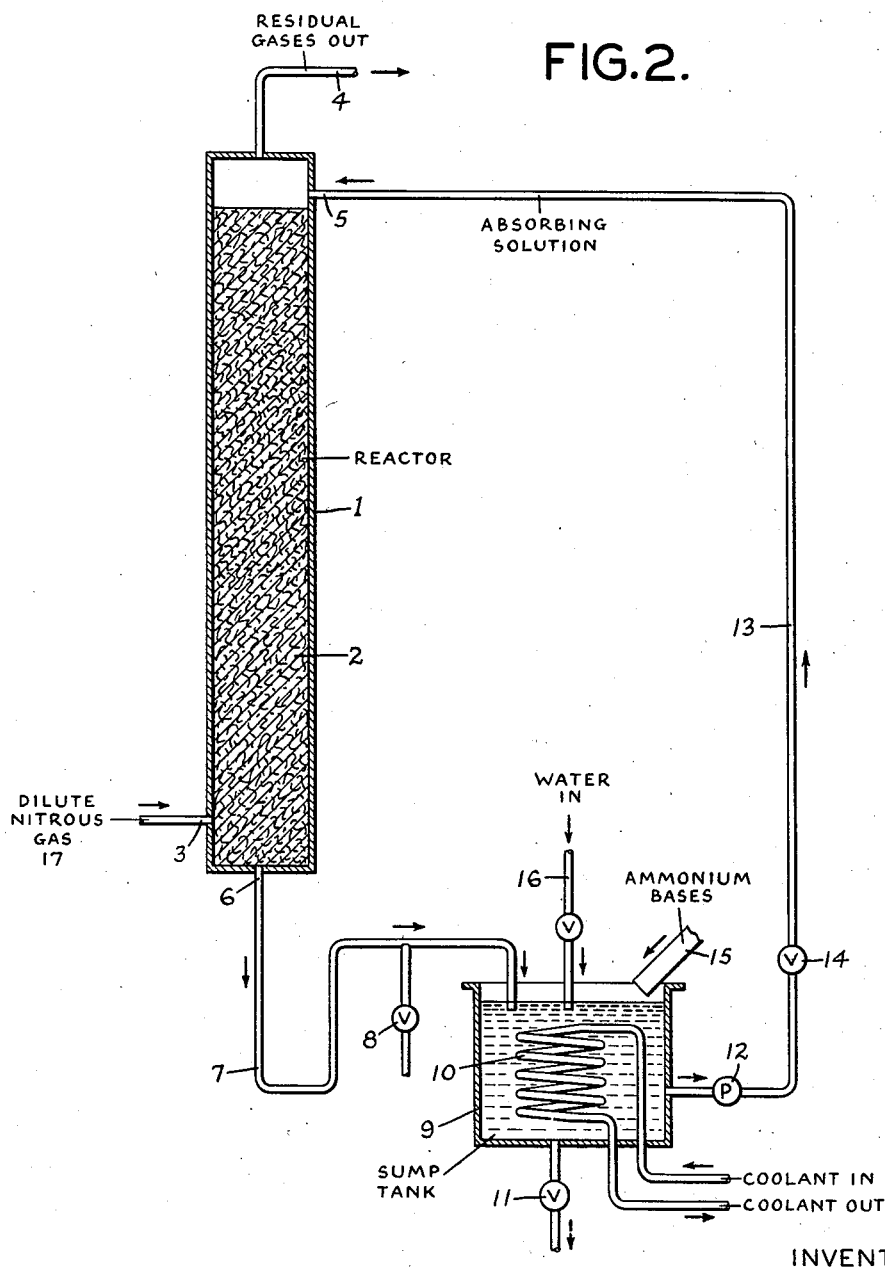
INVENTORS.
LOGAN C. BOSTIAN
GEORGE G. JORIS
KARL T. NILSSON
BY Merton H. Douthitt
ATTORNEY.

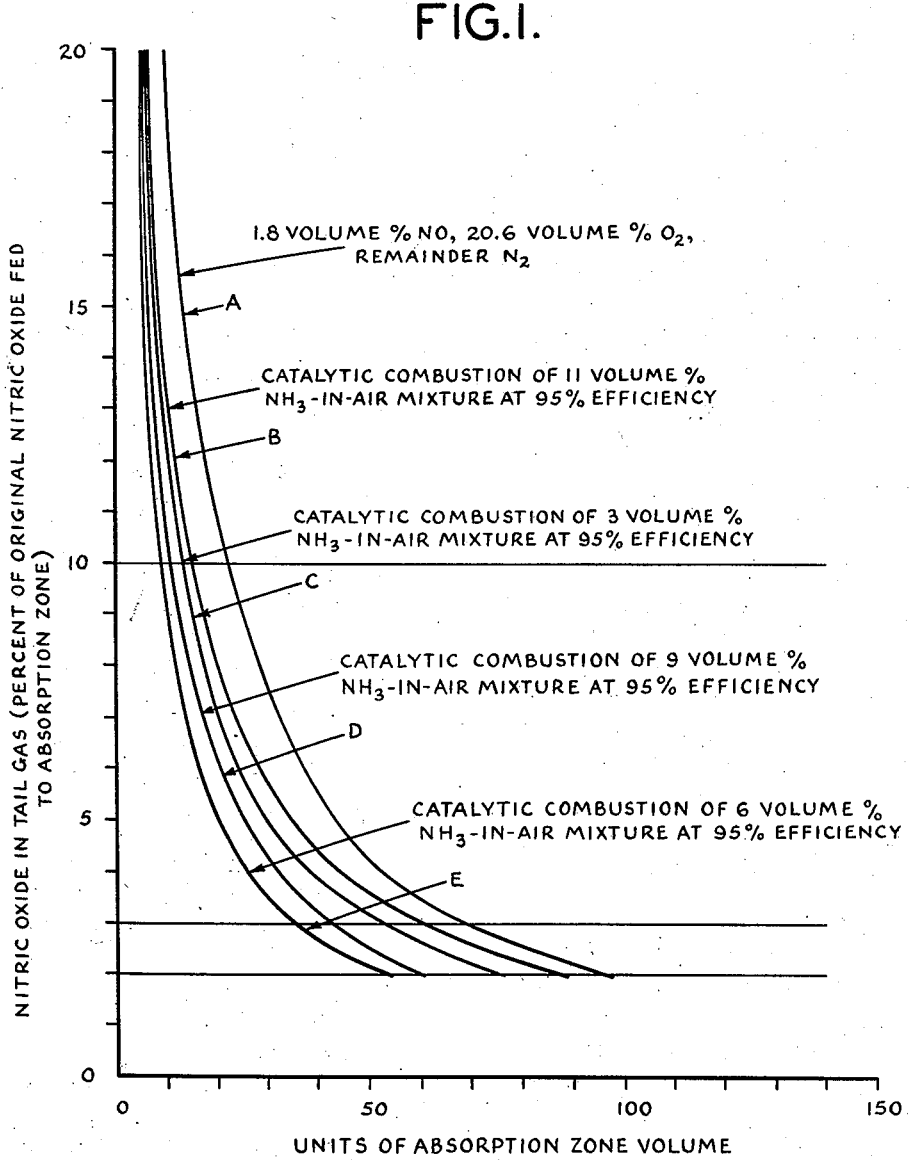

United States Patent Office 2,805,122
Patented Sept. 3, 1957

2,805,122
PROCESS FOR PRODUCING AMMONIUM NITRITE

Logan C. Bostian, Morris Plains, George G. Joris, Madison, and Karl T. Nilsson, Montville, N. J., assignors to Allied Chemical & Dye Corporation, New York, N. Y., a corporation of New York Application January 7, 1954, Serial No. 402,802

7 Claims. (Cl. 23—104)

This invention relates to a process for producing ammonium nitrite and more particularly to an improved method for making this compound directly from gas mixtures comprising in excess of 80 mol percent inert gases (on anhydrous and ammonia-free basis) together with nitric oxide and nitrogen dioxide, e. g. those derived from the catalytic combustion of ammonia-air mixtures, said gas mixtures hereinafter referred to as dilute nitrous gases.

It is well known to make ammonium nitrite by the indirect process of reacting calcium nitrite and ammonium sulfate, filtering off precipitated calcium sulfate, and recovering ammonium nitrite from the filtrate. In the preparation of the alkaline earth metal nitrite for this synthesis, and in the preparation of alkali metal nitrites as well, the nitrogen oxides of a nitrous gas are absorbed in a strong aqueous solution or suspension of the metal hydroxide or carbonate. One is able to use relatively high absorbing temperatures, e. g. 70° C., to advantage since conversion of nitric oxide mostly to nitrogen dioxide and the consequent formation of the metal nitrate is suppressed at these temperatures, while the metal nitrite solution is reasonably stable towards heat and oxidation under said temperature conditions.

The production of ammonium nitrite in high yields and in high purity by the direct absorption of nitrous gases in aqueous ammonium bases presents quite different problems, principally because of four factors: (1) the tendency of the aqueous product solution to decompose rapidly at temperatures above about 50° C.; (2) the radically altered chemical equilibrium of the nitrous gases at the necessarily reduced operating temperature; (3) the volatility of the materials in process; and (4) the side reactions encountered when ammonium ion is substituted for a metallic ion.

The term "absorbing" and similar terms relating to treating of nitrous gases with alkaline solutions are generally understood in the art to comprise both the elements of physical absorption of a gas in liquid and the removal of nitrogen oxides from the gas phase by chemical reaction with the alkali; such is the meaning intended in the instant specification. While the complexity and rapidity of what occurs in the absorption of nitrous gases may preclude exact knowledge of the chemical and physical mechanisms for this process, the following equations are set out to more fully describe what is believed to take place:

Principal reactions

1. $2NO + O_2 \rightleftarrows 2NO_2$
   nitric oxide  oxygen  nitrogen dioxide
2. $NO + NO_2 \rightleftarrows N_2O_3$
   nitrogen trioxide
3. $N_2O_3 + H_2O \longrightarrow 2HNO_2$
   water  nitrous acid
4. $xHNO_2 + (NH_4)_xR \longrightarrow xNH_4NO_2 + H_xR$
   alkaline ammonium compound in which $x$ is the integer 1 or 2 and R is OH anion or the anion of a very weak acid
   ammonium nitrite
   water or weak acid A summation of the preceding equations may be written as follows:

4a. $4xNO + xO_2 + (NH_4)_xR \longrightarrow 4xNH_4NO_2 + 2H_xR$

Equations representing important side reactions are as follows:

5. $5xNO_2 + 4(NH_4)_xR + 2xH_2O \longrightarrow 3xNH_4NO_3 + xNH_4NO_2 + 4H_xR$
   ammonium nitrate
6. $NH_4NO_2 \longrightarrow N_2 + 2H_2O$
   nitrogen
7. $4NH_3 + 4NO + O_2 \longrightarrow 4N_2 + 6H_2O$
   ammonia In the above equations R may be for example the hydroxyl, carbonate, or bicarbonate radical; and $x$ is 1 or 2.

The rate of side reaction 5 is greatly increased under acid conditions, thus the absorption liquor should always be kept alkaline. Side-reaction 7 is believed to take place in the vapor phase.

For production of ammonium nitrite from nitrous gases of desirably high nitric oxide concentration such as 3 or more volume percent, it has been proposed to introduce into concentrated ammonium base solutions a gas stream having essentially equimolar amounts of nitric oxide and nitrogen dioxide. Such gas is obtained by burning ammonia with oxygen supply restricted to prevent formation of excess nitrogen dioxide.

One object of this invention is to extract nitrogen oxides quickly, simply and efficiently, forming ammonium nitrite therefrom in high yields with only small quantities of ammonium nitrate, i. e. substantially less than 10 pounds of ammonium nitrate per 100 pounds of dry salt product.

Another object of this invention is to furnish a process for making ammonium nitrite on a large scale which is operable with a variety of nitrous gases, including a variety of commercially-produced nitrous gases in the form in which they are commercially obtained.

Other objects will appear hereinafter.

We have now discovered that these objects are accomplished by a process which comprises: feeding dilute nitrous gas having stoichiometric mol percent nitric oxide concentration of at least 3 and stoichiometric mol ratio of oxygen:nitric oxide of at least 0.85 into an absorption zone at nitric oxide:nitrogen dioxide mol ratios in said gas above 10:1; and in said zone rapidly and thoroughly contacting the gas with an aqueous absorbing solution maintained below 45° C. and kept basically-reacting by the incorporation therein of a basically-reacting inorganic ammonium compound.

We use the term "stoichiometric" in the expressions "stoichiometric mol percent nitric oxide" and "stoichiometric mol ratio of oxygen:nitric oxide" to include not only the amount and proportion of these feed gas components in their molecular forms NO and $O_2$, but also to include the united NO and $O_2$ moieties of higher oxides of nitrogen which may be present in a particular dilute nitrous gas, e. g. $NO_2$ and $N_2O_4$. The proportion of nitrogen dioxide in equilibrium with oxygen and nitric oxide varies according to temperature, nitrogen dioxide being substantially completely dissociated in the temperature range of 500°–900° C. Thus, the stoichiometric mol percents and mol ratios of the dilute nitrous gases are the actual mol percents and mol ratios existing at a temperature at which dissociation of higher oxides of nitrogen to nitric oxide and oxygen is complete.

We have found that under our reaction conditions specified above and in the claims herein, Equations 2, 3 and 4 above set out correspond to formations and reactions of highly transitory intermediates and that control of the rate to the right of the reaction represented by Equation 1 is the primary concern in making ammonium nitrite as against by-products. Use of our conditions, we have found, minimizes reaction of nitrogen dioxide to make ammonium nitrate (per Equation 5 above) by maintaining the unabsorbed nitrogen dioxide concentration in the vapor phase at a low value in the early stages of absorption; and at the same time our conditions promote the desired reactions 1, 2, 3 and 4 when considerable absorption has occurred.

The graph of Figure 1 shows approximate values of nitric oxide in the tailings (as percent of nitric oxide fed) correlative to absorption zone volume when using unit feed volumes of dilute nitrous gases obtained from various sources and processing them to make ammonium nitrite at 0° C. and 1 atmosphere pressure.

Figure 2 shows one apparatus adapted to carry out the process of our invention. Reactor 1 is a tower filled with packing 2 and has gas inlet connection 3 near its base, vent 4 at its top, solution inlet connection 5 near its top, and solution drain 6 at its base, solution drain 6 being equipped with seal 7 and bleed valve 8. Sump tank 9, equipped with cooling coil 10 and drain valve 11, receives the discharge of solution drain 6. Pump 12 withdraws solution from sump tank 9 and returns it through pump discharge line 13 to solution inlet connection 5 of reactor 1. Pump discharge line 13 is equipped with solution flow control valve 14.

A copious flow of absorbing solution is circulated from top to bottom of reaction 1, the flow being refrigerated by cooling coil 10 and maintained in volume and alkalinity by the addition of a basically-reacting inorganic ammonium compound at inlet 15, and water when necessary at inlet 16. The delivery of pump 12 is controlled by solution flow control valve 14. Dilute nitrous gas 17 is admitted through gas inlet connection 3 and ascends through packing 2 countercurrent to the flow of absorbing solution. Residual gas substantially completely stripped of nitrogen oxides is removed from reactor 1 by vent 4. During operation a side stream of the solution may be withdrawn gradually (incrementally or continuously) at bleed valve 8 for analysis or as production. At the end of operation sump tank solution containing the product may be withdrawn from drain valve 11.

The composition of suitable feed gas for the practice of our invention corresponds to that obtained from the catalytic combustion of about 3 to 9.3 volume percent ammonia-in-air mixtures at 95 percent efficiency. Such feed gas may be obtained not only by ammonia combustion but also by thermal oxidation of nitrogen or from by-product nitrous gas streams. Efficiency of ammonia combustion is based on the amount of ammonia nitrogen converted to nitric oxide with the remainder going to molecular nitrogen.

The cited ammonia combustion gases will contain up to roughly 13 volume percent of water vapor at the burner exit, most of which vapor is condensed when the gas is contacted with aqueous solution at the temperatures used for absorption in our process. All nitrous gas compositions herein cited are based on the content of oxides of nitrogen and permanent gases exclusive of any water or ammonia content.

We find that operation at temperatures from about 0° to 10° C., especially about 5° C., can easily be conducted to give consistently high yields of ammonium nitrite product, whereas at higher temperatures conditions of operation for obtaining comparably high yields appear more critical. However, use of the higher temperatures has the advantage of permitting maintenance of temperature in the aqueous absorbing solution by means of water cooling instead of more expensive refrigeration processes but at the expense of some nitrite yield.

The preferred nitrous gases for the practice of our invention are those obtained by catalytic combustion of about 8 to 9 volume percent ammonia-in-air mixtures. These are the gases commercially produced using the more thermally-sensitive ammonia oxidation catalysts, e. g. cobalt oxide. They can also be produced using the more stable catalysts such as platinum catalysts.

In order to maintain the gas so that its nitric oxide: nitrogen dioxide mol ratio will be above 10:1 for delivery to the absorption reactor we correlate the inlet gas temperature with the concentration of nitrogen oxides and oxygen therein and with the length of time required for delivery from the source. If the feed gas contains water vapor the gas should be maintained above the temperature at which water will condense in the feed line. It is desirable to cool the hot feed gas quickly before inlet to reduce the cooling load in the absorption operation.

Due to its simplicity of construction and effectiveness for our purpose, a packed tower is the preferred form of reactor for the practice of our invention. Commercially-available packings such as Raschig rings or Berl saddles may be employed with good effect. On large reactors auxiliary gas sparging means and liquid and gas redistributing means are often helpful. Other apparatus designed for efficient liquid-to-gas contact can also be employed.

Glass, lead, and other corrosion-resistant materials are suitable for construction or lining of apparatus to be used in our process.

To obtain the best efficiency from packed towers employed in our process, we prefer to employ countercurrent liquid-to-gas flow and to maintain a "superficial liquid-to-gas volume flow ratio" in excess of 0.06, preferably about 0.1 to 0.6. Said superficial flow ratio is defined as the ratio of volume rate of flow of aqueous solution in the tower: volume rate of flow of nitrous gas feed measured at 100° C. and 1 atmosphere pressure.

Our process permits relatively low gas-liquid contact times corresponding to small absorber volumes when operating to extract 90% or more of the nitric oxide values from the gas feed as can be seen by reference to the graph presented in Figure 1, above. As indicated by Figure 1 gas-liquid contact times (absorber volumes) needed to prevent substantial nitric oxide vent losses diverge markedly for various representative dilute nitrous gases. Economic recovery of nitric oxide in our process is estimated to be approximately 97–98% of the nitric oxide fed, the increased fixed charges on a unit capable of more complete recovery offsetting any increased utilization of the feed gas. From Figure 1 it can be seen that gas-liquid contact times (absorber volumes) for operating to the limits of economic recovery are about 15–45 percent lower for a feed gas in our range of composition than for the more concentrated nitrous gas (B) obtained by combustion of an 11 volume percent ammonia-air mixture, and about 25–50 percent lower than that for the more dilute gas (A) having 1.8 volume percent nitric oxide.

In the preferred practice of the invention ammonium bicarbonate or carbonate or mixtures thereof are used to maintain alkalinity of the absorbing solution since they are less volatile than ammonium hydroxide. The ammonium compound may be added as an aqueous solution, as a solid, or as twin flows of ammonia and carbon dioxide gas. We find maintenance of pH about 8–9 is conductive to simplest operation in our process since accurate control of alkaline feed is not required; however, optimum conditions involve slightly lower pH values.

Other basically-reacting inorganic ammonium compounds can be used, including ammonium sulfite disclosed and claimed by applicants George G. Joris and Alvin J. Sweet in their copending patent application Serial No. 339,272, entitled "Nitrous Gas Absorption Process," filed February 27, 1953, now Patent 2,772,145. These compounds can be inert to ammonium nitrite or reactive therewith, whereby the ammonium nitrite product of our process functions as intermediate for production of further products.

To attain the highest product concentration consistent with high yields, we find that the ammonium nitrite concentration in the absorbing solution should be limited to below about 20 weight percent (about 3 molar), preferably to about 15 weight percent (about 2.3 molar). This can be done by withdrawing a portion of product solution from the body of the solution gradually (incrementally or steadily) and making up the remainder of the body with sufficient water and basically-reacting ammonium compound to substantially restore it to initial volume and to maintain the necessary alkalinity, or simply by shutting down at intervals to drain the system, then starting afresh with a new batch of absorbing solution. Generally we operate to obtain an ammonium nitrite concentration of at least about 9 weight percent in the aqueous product of our process, since more dilute solutions are more expensive to handle after manufacture.

While pressures above and below atmospheric can be used in the practice of our process, we prefer to use atmospheric pressure since it is economical and effective for our purpose.

The following examples describe several ways in which the principles of our invention have been applied, but are not to be construed as limiting the invention.

*Example 1.*—1.013 gram mols per hour of ammonia, as a 9 volume percent mixture of ammonia in air, were burned at about 95% efficiency and essentially constant rate over a cobalt oxide catalyst maintained at about 700° C. The burner product gases were quickly cooled to about 100° C. in a tubular heat exchanger so as to maintain the mol ratio of nitric oxide:nitrogen dioxide in the gas about 49:1, then continuously admitted to a glass reactor 2.5 inches internal diameter, 8 feet tall, and packed to a depth of 86 inches with ¼ inch ceramic Berl saddles, the reactor being arranged and equipped similarly to that shown in Figure 2. The packing was irrigated at the rate of 520 cc. per minute from the top by a circulating flow of aqueous solution maintained basically-reacting at all times by the addition of a total of 10.91 gram mols of ammonium bicarbonate at half hour intervals to the solution in the sump tank, the average pH being 7.7. Average temperature of 9° C. was maintained by refrigerating the contents of the sump tank. Solution pH and temperature were measured in the solution draining from the reactor base. Superficial liquid-to-gas volume flow ratio was 0.09. When the ammonium nitrite concentration of the solution draining from the reactor base reached 12.1 weight percent, the run was terminated. Products of the run were 8.23 gram mols of ammonium nitrite and 0.32 gram mols of ammonium nitrate. The overall yield of ammonium nitrite based on ammonia fed to the catalytic burner was 81.2%. By material balance it was estimated that approximately 6.6% of the ammonia used was lost in the form of nitrogen oxides in the vent gas. Such vent losses can be reduced by increasing the duration and intensity of gas-to-liquid contact.

*Example 2.*—1.01 gram mols per hour of ammonia were burned and cooled in the manner described in Example 1 and fed into the reactor used in Example 1. The packing was irrigated at the rate of 600 cc. per minute from the top by a circulating flow of aqueous solution maintained basically-reacting at all times by the addition of ammonium carbonate. Solution pH and temperature were measured in the solution draining from the reactor base. Average pH of 7.7 was maintained by adding an aggregate of 4.5 mols of ammonium carbonate at frequent intervals to the solution in the sump tank. Superficial liquid-to-gas volume flow ratio was 0.1. When the ammonium nitrite content of the liquor draining from the reactor base reached 11.5 weight percent ammonium nitrite, the run was terminated. Products of the run were 7.05 mols of ammonium nitrite with ammonium nitrate about 1% of the ammonium nitrite content. The overall yield of ammonium nitrite based on ammonia fed to the catalytic burner was 78%.

*Example 3.*—0.936 gram mols per hour of ammonia were burned and cooled in the manner described in Example 1 and fed into the reactor used in Example 1. The packing was irrigated at the rate of 650 cc. per minute from the top by a circulating flow of aqueous solution maintained basically-reacting at all times by the addition of ammonium carbonate-bicarbonate mixture. Solution pH and temperature were measured in the solution draining from the reactor base. Average pH of 8.3 was maintained by adding an aggregate of 3.78 mols of ammonium bicarbonate and 3.74 mols of ammonium carbonate to the solution in the sump tank. Superficial liquid-to-gas volume flow ratio was 0.12. When the ammonium nitrite content of the liquor draining from the reactor base reached 13.25 weight percent ammonium nitrite, the run was terminated. Products of the run were 8.87 mols of ammonium nitrite with ammonium nitrate about 1% of the ammonium nitrite content. The overall yield of ammonium nitrite based on ammonia fed to the catalytic burner was 80.6. Vent loss of nitric oxide was 3.0 percent of the nitric oxide fed to the absorber.

*Example 4.*—Over a period of 87 hours 149 pounds of ammonia were burned in the manner described in Example 1. The burner product gases were quickly cooled to about 150° C. in a tubular heat exchanger and continuously admitted into the base of an absorption tower so as to maintain the oxidized nitrogen content of the gas virtually completely nitric oxide. The absorption equipment, arranged as depicted in Figure 2, consisted of a 24 inch diameter, 12 foot tall aluminum tower packed with 2-inch Raschig rings, the tower having liquid and gas inlets and outlets, a 110 gallon aluminum sump receiving drainage from the tower and containing refrigerating coils, and a circulating pump disposed to deliver irrigating solution from the sump to the liquid inlet of the tower. The packing was irrigated at the rate of 35 gallons per minute. Temperature of the circulating solution was maintained between 0° and 5° C. The superficial liquid-to-gas volume flow ratio was 0.5. Irrigating solution pH was maintained between 7.5 and 8.5 by gradual introduction of ammonium carbonate to the sump initially as a solid until the ammonium nitrite concentration in the irrigating solution reached 15% by weight and thereafter as an aqueous solution. A total of 520 pounds of ammonium carbonate were used in the operation.

When the ammonium nitrite concentration in the irrigating solution reached 15% by weight, product solution was gradually withdrawn from the liquor flowing from the base of the tower in order to maintain the ammonium nitrite concentration in the irrigating solution at about 15% by weight for the duration of the run. The volume of aqueous ammonium carbonate solution being added to the sump was about equal to the volume of product solution withdrawn and thereby kept the volume of irrigating solution essentially constant. At the end of the period product solution containing 473.6 pounds of ammonium nitrite and 33.1 pounds of ammonium nitrate had been collected. The overall yield of ammonium nitrite based on ammonia fed to the catalytic burner was 84.5%.

In place of the carbonates of ammonia used in the preceding examples, ammonium hydroxide can be used to maintain alkalinity of the absorbing solution. In such case however volatility of ammonia is increased and ammonia losses to the vent gas are considerable, necessitating recovery processing for economic operation.

Operations involving maintaining low pH of and a low concentration of unreacted alkaline component in the absorbing medium are more fully described and claimed by applicant L. C. Bostian in his co-pending patent application Serial No. 402,803 entitled Process for Producing Ammonium Nitrite, filed simultaneously herewith.

We claim:

1. A process for the manufacture of ammonium nitrite which comprises: feeding dilute nitrous gas having at least 80 mol percent permanent inert gas together with nitric oxide and nitrogen dioxide and having stoichiometric mol percent nitric oxide concentration i. e. mol percent concentration of nitric oxide including molecular nitric oxide NO, and any nitric oxide combined with oxygen as higher oxides of nitrogen of at least 3%, based on the content of oxides of nitrogen and permanent gases, and stoichiometric mol ratio of oxygen gas:nitric oxide of at least 0.85:1 into an absorption zone at nitric oxide:nitrogen dioxide mol ratio in said gas above 10:1; and in said zone rapidly and thoroughly contacting and thereby reacting the gas with aqueous absorbing solution maintained below 45° C. and kept basically-reacting by the incorporation therein of a basically-reacting inorganic ammonium compound.

2. The process as defined in claim 1 wherein the nitrous gas is the product of catalytic combustion of ammonia and air mixture, said mixture containing 3–9.3 volume percent ammonia; and wherein the aqueous absorbing solution is maintained at a temperature in the range between about 0° C. and about 10° C.

3. The process as defined in claim 2 wherein the aqueous solution is maintained basically-reacting by the incorporation therein of ammonium bicarbonate.

4. The process as defined in claim 2 wherein the aqueous solution is maintained basically-reacting by the incorporation therein of ammonium carbonate.

5. The process as defined in claim 2 wherein the aqueous solution is maintained basically-reacting by the incorporation therein of ammonium hydroxide.

6. The process as defined in claim 2 wherein the nitrous gas is the product of catalytic combustion of an ammonia-air mixture containing 8–9 volume percent ammonia, the feed gas temperature is maintained above 100° C. prior to the reactor inlet, countercurrent absorption contact is maintained between said gas and the absorbing solution in a packed absorption zone, the ammonium nitrite concentration in the body of the solution is maintained below 20 weight percent, and the superficial volume flow ratio of liquid-to-gas is above about 0.06.

7. The process as defined in claim 6 wherein the ammonium nitrite concentration in the body of solution is maintained above 9 and below 20 weight percent by gradually withdrawing a portion of said body of solution containing ammonium nitrite and adding sufficient water and basically-reacting ammonium compound to the remainder of said body of solution to substantially restore it to initial volume and alkalinity.

References Cited in the file of this patent

UNITED STATES PATENTS

| | | |
|---|---|---|
| 1,903,815 | Handforth | Apr. 18, 1933 |
| 2,032,699 | Hayes et al. | Mar. 3, 1936 |
| 2,467,274 | Shields et al. | Apr. 12, 1949 |
| 2,606,813 | Kahr | Aug. 12, 1952 |

FOREIGN PATENTS

| | | |
|---|---|---|
| 9,884 | Great Britain | of 1910 |

OTHER REFERENCES

Chem. Abs., vol. 47 (4563–4564), 1953.